United States Patent [19]
Chen

[11] Patent Number: 6,046,823
[45] Date of Patent: Apr. 4, 2000

[54] INTERFACE CONTROL FOR ANALOG SIGNAL PROCESSING

[75] Inventor: Michael Chen, Hsin-Chu, Taiwan

[73] Assignee: Avision Inc., Hsin-Chu, Taiwan

[21] Appl. No.: 09/041,303

[22] Filed: Mar. 12, 1998

[51] Int. Cl.⁷ ...................................... B41B 15/00
[52] U.S. Cl. .............................. 358/1.9; 358/442
[58] Field of Search ..................... 358/442, 468, 358/1.1, 1.9, 1.12, 434, 401, 405, 406, 448; 399/78, 82, 90

[56] References Cited

U.S. PATENT DOCUMENTS

| | | | |
|---|---|---|---|
| 5,652,910 | 7/1997 | Boutaud et al. | 395/800 |
| 5,742,761 | 4/1998 | Olnowich et al. | 395/200.2 |
| 5,745,684 | 4/1998 | Oskouy et al. | 395/200.8 |
| 5,874,909 | 2/1999 | Soenen et al. | 341/141 |

*Primary Examiner*—Madeleine Nguyen

[57] ABSTRACT

An interface for a color image signal processing system is implemented with a common input/output data lines to reduce the number of pin-counts of a integrated circuit. The input control protocol is shared with the data output and selected by an "Output Enable" signal, which also acts as a synchronization control signal.

16 Claims, 6 Drawing Sheets

INTERFACE CONTROL FOR ANALOG SIGNAL PROCESSING

BACKGROUND OF THE INVENTION

This invention relates to an interface architecture especially an interface protocol used for analog signal image signal processor.

Recently, the performance progress in personal computer (PC) has been becoming more powerful in either CPU processing speed or data storage ability. Also the worldwide Internet effectively reduces the distance between people. All of these factors have created a strong demand in color image processing system, such as desktop scanners, sheet feed scanners, handy scanners, electronic cameras, bar-code readers, etc.

Conventionally, an imaging system controller uses a complicated serial or parallel interface protocol to control the signal processing operation. The digital image data of analog signal processor are outputted to a parallel port. The number of data output ports depends on the resolution of the analog-to-digital converter. For high resolution image processing systems, the digital data output must allocate a large number of pins of a package to translate its correlated analog image pixel signal, such that the total analog image signal processor cost is dominated by the chip size of data output pads, which are limited, and the cost of high pin-count package.

SUMMARY OF THE INVENTION

An object of this invention is to use novel interface control for analog processing to reduce number the chip size of an analog signal processor. Another object of this invention is to reduce the number of pin-counts of an image processing integrated circuit. Still another object of this invention is to simplify design interface control between system controller and the analog signal processor.

These objects are achieved by the use of an interface architecture between a system controller and an analog signal processor. Common input/output data terminals are shared to reduce the number of pin-counts of the imaging IC. The input/output operation is controlled by an Output Enable (OE) signal. Correlated double sampling (CDS) can abstract the signal offset error of the incoming signal. The programmable gain amplifier (PGA) adjustment can improve the color balance of the different color image signals due to uneven illumination, RGB (red, green, blue) filter mismatch, etc. An analog multiplexer selects the signal channel to be processed. A 12-bit or 10-bit analog-to-digital converter is used for different resolution processing. A digital multiplexer is used to select the digital image data output dispatch format.

DETAILED DESCRIPTION OF THE INVENTION

Figure 1:
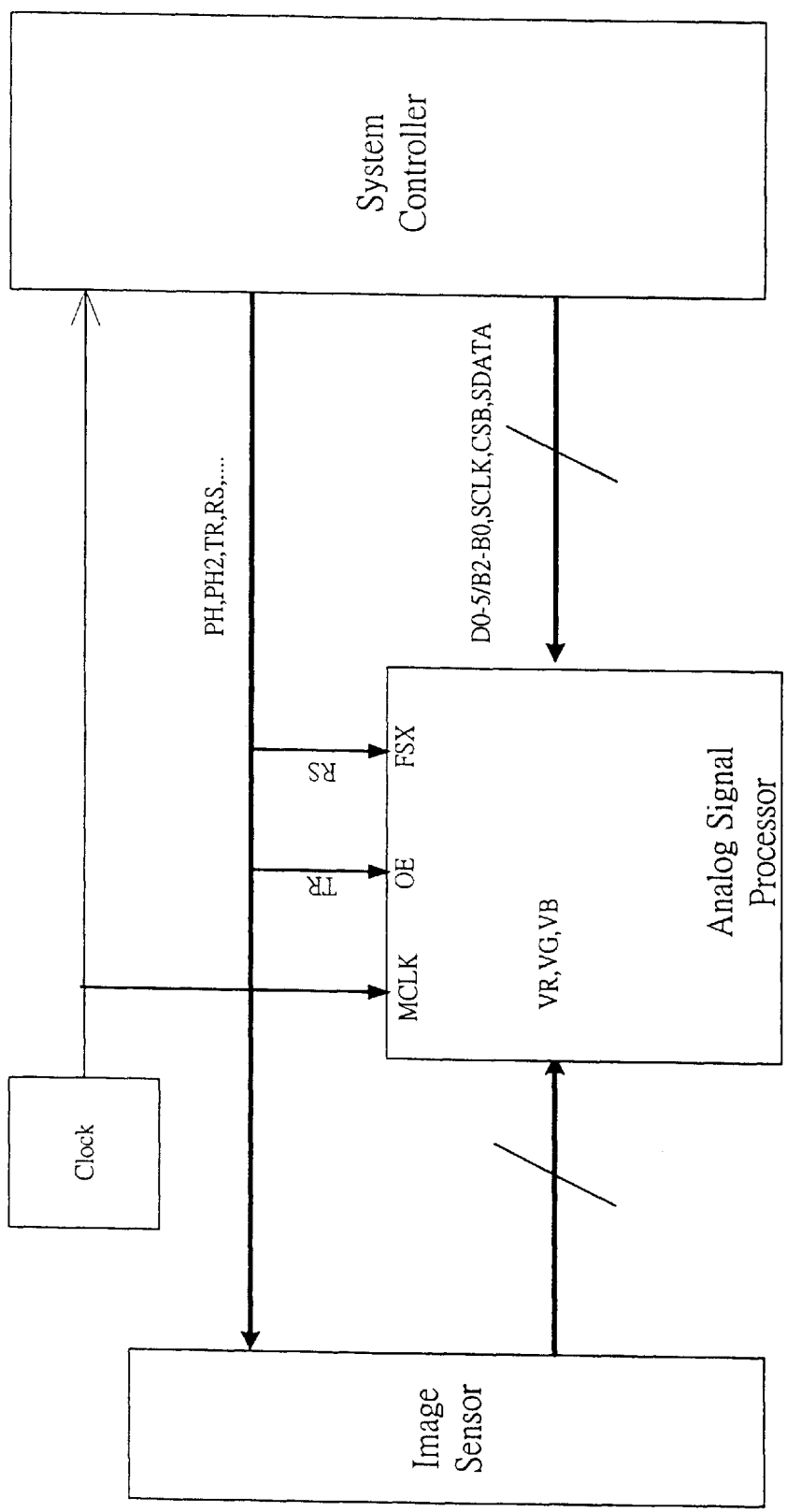
FIG. 1 shows the block diagram of an image capture system of the present invention.

FIG. 1 shows the block diagram of an interface control used in the image processing system of this invention. The system controller provides timing control to the image sensor which generates the correlated analog image signal. The analog processor translates the analog image signal into digital output data according to the resolution of the analog-to-digital converter (ADC) used. This digital image data are transferred to the system controller via a novel proposed interface. The system controller also communicates with the analog signal processor and image sensor by the same novel interface.

Figure 2:
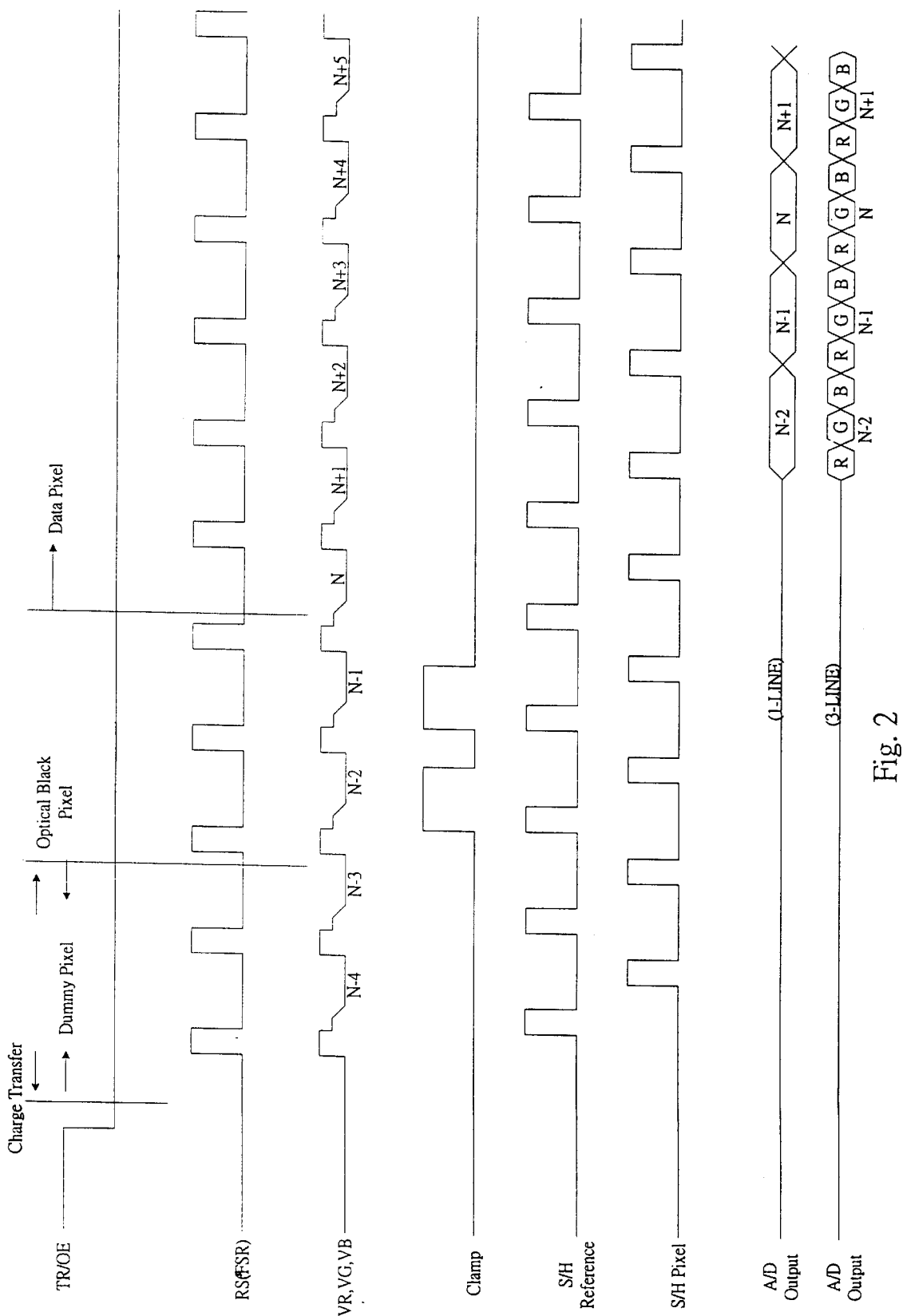
FIG. 2 shows the timing diagram of the system.

The interface used in the image processing system in this invention adopts the timing as shown in FIG. 2 as the scanning timing control, the dummy pixel and optical black pixel timing for the clamp and Sample-and-Hold control. System controller uses the OE (Output Enable) signal to distinguish the data bus input/output direction and the synchronization signal of the image sensor line. When OE signal is high, the system controller can control the analog signal processor through the data bus D0–D5, while the image sensor clears the residue analog image charge. When OE is low, the data bus D0–D5 turn into output port to output the digital image data to the system controller. Meanwhile, the image sensor starts to expose the document line and to shift out the analog pixel signal of the last exposed line to an analog signal processor by means of a charge control device (CCD). The converted digital image signal can output to the system controller line-by-line or pixel-by-pixel via control command. The converted digital image signal can also generate the required clamp signal (Clamp) and sample-Hold (S/H) signal for analog signal processor to process the incoming analog image signal.

Figure 3:
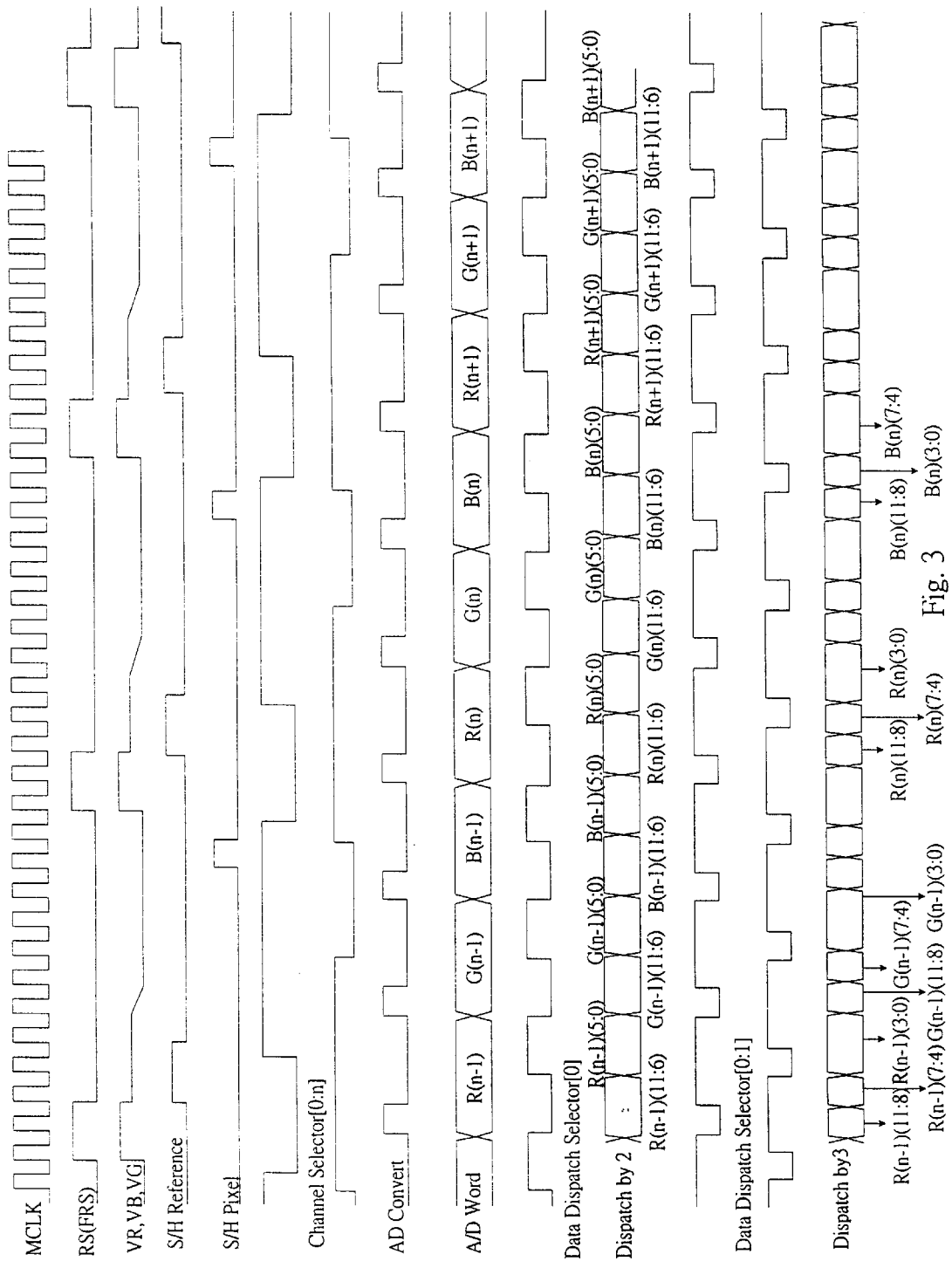
FIG. 3 shows the detailed pixel timing of the analog processor.

Using OE as image sensor synchronization signal, together with Pixel synchronization signal (FSR), the internal clock MCLK slices the time frame for the ADC conversion time and digital image data dispatched format shown in FIG. 3 to save the pin-count of the analog signal processor and system controller by reducing the digital image data output pins. It can dispatch the high resolution ADC digital output data into 2-folds or 3-folds, which save more pin-count, and transfer these folded data between system controller and analog signal processor to save the data transfer pin-count.

The input control protocol can also share the data output pin count by the OE signal control. Beside the OE signal for input and output control, an additional CSB (Control for Serial Bus) signal is also used in an input communication mode as synchronization control signal of the serial bus input interface. When CSB changes state from high to low, it means that the serial clock SCLK starts to transmit control data into analog signal processor, according to the first transmitted bit state to distinguish write and read mode. The total CSB occupies 16 SCLK as a 16-bit word transfer. Meanwhile, the color mode bit can also be set by D5–D3 corresponding to b2–b0. The input register read/write control timing of the proposed interface.

Figure 4:
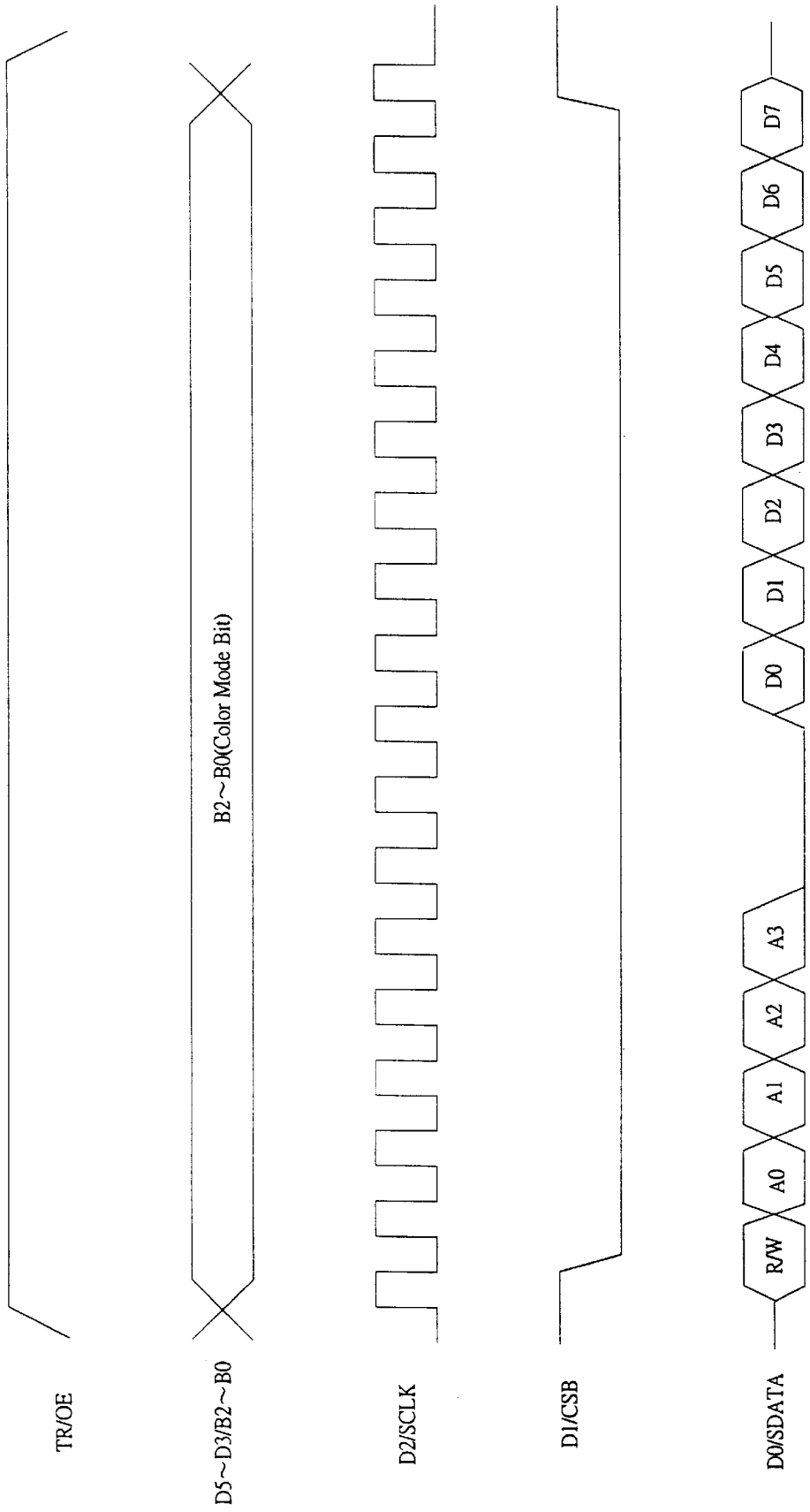
FIG. 4 shows the timing diagram of the Configuration Register Read/Write, Color Mode Bit Setting using Continuous Serial Clock SCLK (16-bit word).

FIG. 4 shows the timing diagram of the Configuration Register Read/Write (TR/OE), the Color Mode Bit Setting using CSB, and Continuous SCLK (16-bit Word). FIG. 4 also shows the Fast Color Mode Setting using SCB.

The control register listed below is an example of the application of the system:

Address 00H determines the line-by-line transfer or pixel transfer format, CDS mode, Line Clamp mode, S/H mode, Fast Color mode using through D5–D1 (B2–B0), etc.

Address 01H; Configuration Register
  (Color Mode Bit)
    b2, b1, b0 000=Monochrome VR (R0, R1, R2, . . . )
      001=Monochrome VG (G0, G1, G2, . . . )
      010=Monochrome VB (B0, B1, B2, . . . )
      011=Bayer R0, G0, R1, R2, G2, B2, . . . )
      100=Colormode (R0, G0, B0, R1, R2, G2, B2, . . . )
    b3: Data dispatch format setting.
Address 02H: S/H reference location setting.
Address 03H: S/H pixel location setting.
Address 04H: A/D conversion location setting.
Address 05H: Clamp start location.
Address 06H: Clamp end location.
Address 07H: R Gain setting.
Address 08H: G Gain setting.
Address 09H: B Gain setting.
Address 0AH: R Offset setting.
Address 0BH: G Offset setting.
Address 0CH: B Offset setting.

All these control registers can be written into and read back via the proposed novel serial interface between system controller and analog signal processor. It can reduce the needed pin-out of data transfer and save the total system cost. Also, it uses OE as input/output sharing signal and sensor synchronization signal, so as to simplify the system design timing and to increase the system efficiency.

Figure 5A:
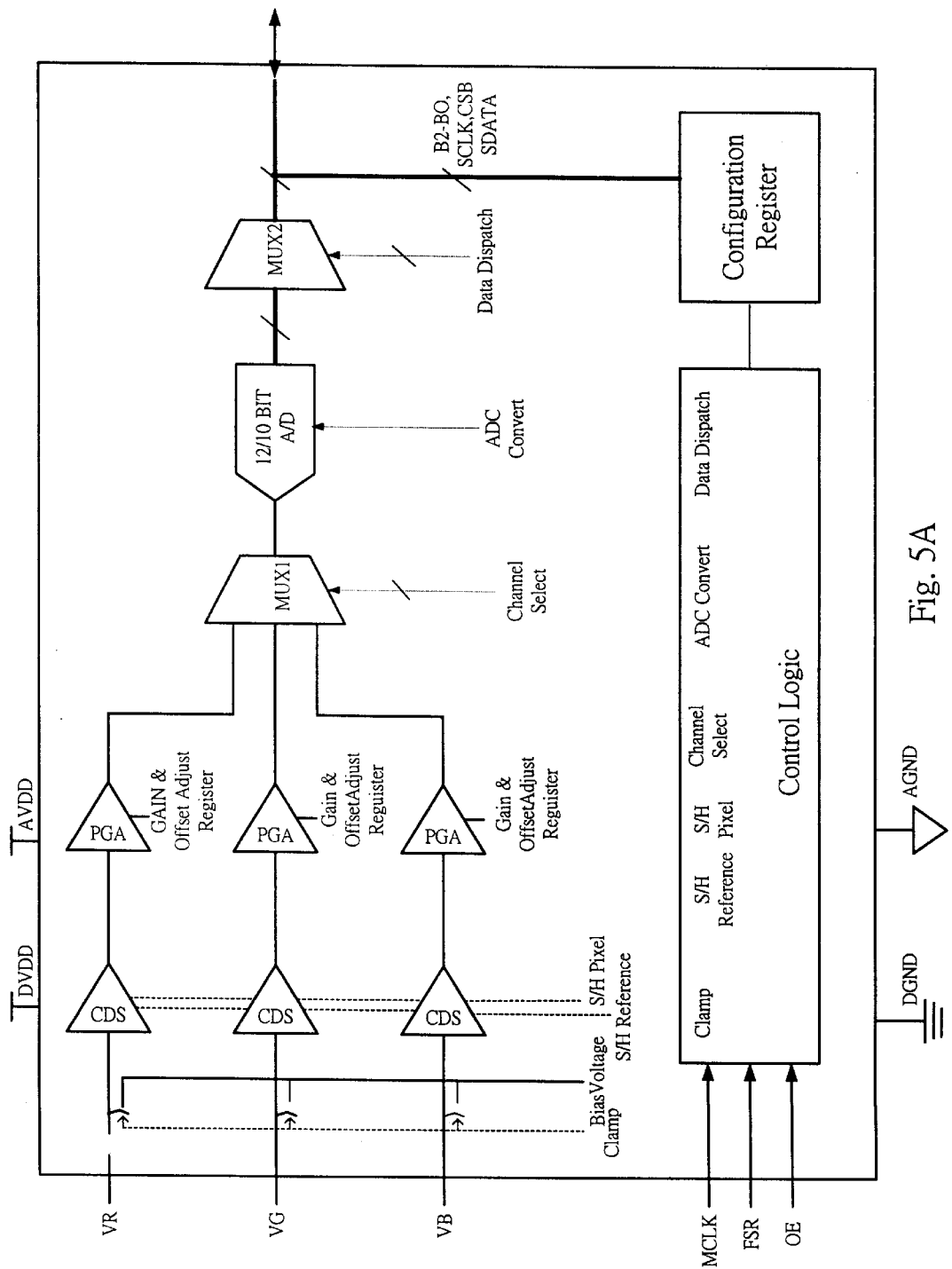
FIG. 5A shows the functional block diagram.

FIG. 5A shows the block diagram of analog signal processor and its pin assignment. The analog image signal form the image sensor is inputted to the analog signal processor through VR (Red), VG (Green), VB (Blue) channel. The CDS circuit removes the offset voltage of each color signal. The Gain & Offset Adjust Register PGA fine tunes the signal to its maximum quality. The analog multiplexer (MUX1) selects the processed signal input to the ADC according to the control register command. The high resolution ADC converts the analos input signal into digital image data. The digital multiplexer (MUX2) dispatches the digital image data into 2-folded or 3-folded one to save more pin count. The configuration register controls the operation of the analog signal processor. The control logic communicates with the system controller via the novel interface provided to command the control registers.

Figures 5B, 5C:
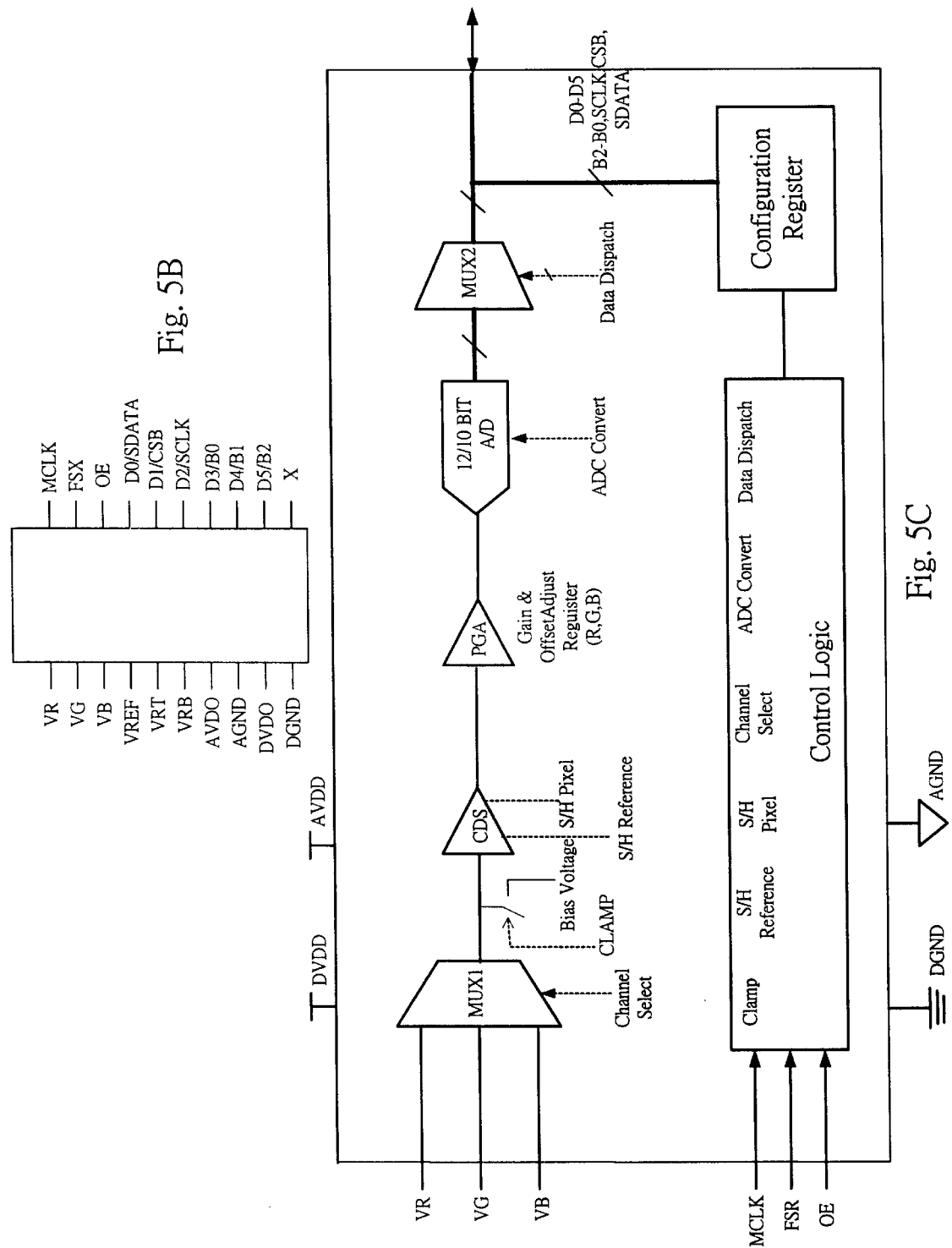
FIG. 5B shows its in assignment.
FIG. 5C shows another version of the functional block.

FIG. 5B shows the terminals of the interface function block. The terminals are:
  VR, VG, VB: red, blue, green signals
  VREF: External generated reference voltage
  VRT: Top voltage reference of the A/D converter
  VRB: Bottom voltage reference of the A/L) converter
  AVDD: a positive supply voltage
  AGND: a ground
  DVDD: a second positive supply voltage
  DGND: a second ground
  MCLK: master clock
  FSR: Pixel synchronization signal
  OE: Output enable
  DO/SDATA: data line #0/Serial Data Input/Output
  D1/CSB: data line #1/Configuration register Serial Program Enable
  D2/SCLK: data line #2/Serial Program clock
  D3/Bo: data line #3/B0 bit setting
  D4/1: data line #4/B1 bit setting
  D5/B2: data line #5/B2 bit setting FIG. 5C shows another version of the function block. This architecture is designed for service by line type. MUX1 selects which incoming signal is to be processed. CDS is one set. PGA block is another set but provides three sets of gain and offset registers, depending which color is serviced. The control register has the following addresses:
  Address 01H: Configuration Register
    (Color Mode Bit)
    b2, b1, b0: 000=Monochrome VR (R0, R1, R2, . . . )
      001=Monochrmoe VG (G0, G1, G2, . . . )
      010=(Monochrome VB (B0, B1, B2, . . . )
    b3: Data dispatch format setting
    b4: CDS mode/ S/H mode
    b5: Line Clamp Mode
    b6: Fast Color Mode
  Address 02H: S/H reference location setting
  Address 03H: S/H pixel location setting
  Address 04H: AID conversion location setting
  Address 05H: Clamp start
  Address 06H: Clamp end location
  Address 07H: R Gain setting
  Address 08H: G Gain setting
  Address 09H: B Gain setting
  Address 0AH: R Offset setting
  Address 0BH: G Offset setting
  Address 0CH: B Offset setting While the preferred embodiment of the invention has been show and described, it will be apparent to those skilled in this art that various modification may be made in the embodiment without departing from the spirit of the present invention. Such modifications are all within the scope of this invention.

What is claimed is:

1. An interface for a color image processing system comprising:
   a set of more than one common input/output data bus;
   a correlated double sampler;
   three programmable gain amplifiers for three primary color signals of said color image, having adjustment to eliminate the difference in said three primary color signals of said color image due to uneven illumination;
   three signals channels for said three primary color signals;
   an analog-to-digital converter (ADC) to convert said one of said three primary signals into digital image data for use to select a dispatch format for said digital image data to feed more than data bus; and
   a controller using an output enable (OE) signal to distinguish input/output direction of said data bus;
   said OE signal in a first binary state controlling an input signal processing through said data bus,
   said OE signal in a second binary state controlling digital image data output to said data bus.

2. An interface as described in claims 1, wherein said OE signal further functions as a synchronization signal.

3. An interface for a color image processing system comprising:
   a set of more than one common input/output data bus;
   a correlated double sampler;
   three programmable gain amplifiers for three primary color signals of said color image, having adjustment to eliminate the difference in said three primary signals of said three primary color signals of said color image due to uneven illumination;
   three signal channels for said primary color signals;
   an analog-to-digital (ADC) converter to convert said one of said three primary signals into digital image data for use to select different resolution in signal processing;

a digital multiplexer to select a dispatch format for said digital image data to feed more than one data bus;

a controller using an output enable (OE) signal to distinguish input/output direction of said data bus, said OE signal in a first binary state controlling an input signal processing through said data bus and functioning as a synchronization signal, said OE signal in a second binary state controlling digital image data output to said data bus; and an internal clock slicing a time frame into a conversion time for said ADC and dispatch time for said digital image data.

4. An interface as described in claim 3, wherein said digital image data are folded more than once.

5. An interface as described in claim 4, wherein said digital image data are folded twice.

6. An interface as described in claim 4, wherein said digital image data are folded trice.

7. An interface as described in claim 1, wherein said image data are folded trice.

8. An interface as described in claim 1, wherein said image data are outputted pixel-by-pixel of a scanned image.

9. An interface for a color image processing system, comprising;

a set of three common input/output data bus;

an analog multiplexer to select one of three primary color signals;

a correlated double sampler;

a programmable gain amplifier for one of three primary color signals into digit image data for use to select different resolution in signal processing;

an analog-to-digital converter (ADC) to convert said one of three primary signals into digital image data for use to select different resolution in signal processing;

a digital multiplexer to select a dispatch format for said digital image data to feed more than one said data bus;

a controller using an output enable signal to distinguish input/output direction of said data bus, said OE signal in a first binary state controlling an input signal processing through said data bus, said OE signal in a second binary state controlling digital image data output to said data bus.

10. An interface as described in claim 9, wherein said OE signal further functions as a synchronization signal.

11. An interface for a color imager processing system, comprising:

a set of three common input/output data bus;

an analog multiplexer to select three primary color signals;

a correlated double sampler;

a programmable gain amplifier for one of said color signals if said color image, having adjustment to eliminate the difference in said three primary color signals of said color image due to uneven illumination;

an analog-to-digital converter (ADC) to convert said one of three primary signals into digital image data for use to select different resolution in signal processing;

a digital multiplexer to select a dispatch format for said digital image data to feed more than one said data bus; and a controller using an output enable (OE) signal to distinguish input/output direction of said data bus and function as a synchronization signal, said OE signal in a first binary state controlling an in input signal processing through said data bus and functioning as a synchronization signal, said OE signal in a second binary state controlling digital image data output to said data bus; and an internal clock slicing a time frame into a conversion time for said ADC and dispatch time for said digital image data.

12. An interface as described in claim 11, wherein said digital image data are folded more than once.

13. An interface as described in claim 12, wherein said digital image data are folded twice.

14. An interface as described in claim 12, wherein said digital image data are folded trice.

15. An interface as described in claim 9, wherein said image data are outputted line-by-line of a scanned image.

16. An interface as described in claim 9, wherein said image data are outputted pixel-by-pixel of a scanned image.

\* \* \* \* \*

UNITED STATES PATENT AND TRADEMARK OFFICE
CERTIFICATE OF CORRECTION

PATENT NO. : 6,046,823
DATED : April 4, 2000
INVENTOR(S) : Michael Chen

It is certified that error appears in the above-identified patent and that said Letters Patent is hereby corrected as shown below:

Claim 1,
Line 12, after "select", insert -- different resolution in signal processing; a digital multiplexer to select;
Line 13, after "than", insert -- one --.

Signed and Sealed this

Twenty-eighth Day of August, 2001

*Attest:*

*Nicholas P. Godici*

NICHOLAS P. GODICI
*Attesting Officer*     *Acting Director of the United States Patent and Trademark Office*